United States Patent
Lefkow et al.

(10) Patent No.: US 10,846,780 B2
(45) Date of Patent: Nov. 24, 2020

(54) ORDER QUANTITY AND PRODUCT RECOMMENDATIONS BASED ON SENSOR DATA

(71) Applicant: Amazon Technologies, Inc., Seattle, WA (US)

(72) Inventors: Dave Jonathan Lefkow, Bellevue, WA (US); Chris Brown, Seattle, WA (US); Samuel Stevens Heyworth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 15/927,990

(22) Filed: Mar. 21, 2018

(65) Prior Publication Data

US 2019/0295148 A1 Sep. 26, 2019

(51) Int. Cl.
*G06Q 30/06* (2012.01)
*G06Q 10/08* (2012.01)
*G06Q 30/02* (2012.01)

(52) U.S. Cl.
CPC ....... *G06Q 30/0633* (2013.01); *G06Q 10/087* (2013.01); *G06Q 10/0833* (2013.01); *G06Q 30/0631* (2013.01); *G06Q 30/0637* (2013.01); *G06Q 30/0261* (2013.01); *G06Q 30/0635* (2013.01)

(58) Field of Classification Search
None
See application file for complete search history.

(56) References Cited

U.S. PATENT DOCUMENTS

| | | | |
|---|---|---|---|
| 5,168,445 A | * | 12/1992 | Kawashima ......... G06Q 10/087 700/90 |
| 5,235,509 A | | 8/1993 | Mueller et al. |
| 6,204,763 B1 | | 3/2001 | Sone |

(Continued)

FOREIGN PATENT DOCUMENTS

| | | |
|---|---|---|
| WO | 2016149674 | 9/2016 |
| WO | 2017118845 | 7/2017 |

OTHER PUBLICATIONS

Welch, J., et al., "Seven Keys to ERP Success," Strategic Finance, 89.3: 40-47,61. Institute of Management Accountants. (Sep. 2007) (Year: 2007).*

(Continued)

*Primary Examiner* — Nicholas D Rosen
(74) *Attorney, Agent, or Firm* — Kilpatrick Townsend & Stockton LLP

(57) ABSTRACT

Techniques for using sensor data from an auto replenishment device (ARD) to generate recommendations for ordering other items not associated with an ARD, updating a quantity of an already ordered item, or updating a time period associated with delivery of the ordered items. In embodiments, order history information associated with a user profile for a plurality of items may be maintained. Consumption data from a sensor of an ARD may be received that indicates a current amount of the item. A subset of items may be determined based at least in part on the consumption data and the order history information. In accordance with at least one embodiment, instructions for delivering the subset of items to a location associated with the user profile may be executed.

10 Claims, 9 Drawing Sheets

(56) References Cited

U.S. PATENT DOCUMENTS

| | | | |
|---|---|---|---|
| 8,260,672 B2* | 9/2012 | Weel | G06Q 10/08 |
| | | | 705/23 |
| 8,718,620 B2* | 5/2014 | Rosenblatt | G06Q 30/06 |
| | | | 455/414.3 |
| 9,267,834 B2* | 2/2016 | Chowdhary | H04L 67/18 |
| 9,619,831 B1* | 4/2017 | Kumar | G06Q 30/0631 |
| 10,360,617 B2* | 7/2019 | High | G06Q 10/087 |
| 10,373,118 B1* | 8/2019 | Lefkow | G06Q 10/0838 |
| 10,438,276 B2* | 10/2019 | Godsey | G06Q 10/087 |
| 10,445,672 B2* | 10/2019 | Renfroe | G06Q 30/0641 |
| 10,445,819 B2* | 10/2019 | Renfroe | G06Q 10/087 |
| 10,474,987 B2 | 11/2019 | Corona et al. | |
| 2007/0162326 A1* | 7/2007 | Weel | G06Q 10/08 |
| | | | 705/23 |
| 2008/0113614 A1* | 5/2008 | Rosenblatt | G06Q 30/06 |
| | | | 455/3.05 |
| 2011/0153466 A1 | 6/2011 | Harish et al. | |
| 2012/0038456 A1 | 2/2012 | Pikkarainen et al. | |
| 2013/0038455 A1* | 2/2013 | Chowdhary | G01F 23/284 |
| | | | 340/612 |
| 2014/0095479 A1 | 4/2014 | Chang et al. | |
| 2014/0203040 A1 | 7/2014 | Clark et al. | |
| 2015/0178654 A1* | 6/2015 | Glasgow | G06Q 10/06315 |
| | | | 705/7.25 |
| 2015/0186836 A1 | 7/2015 | Chouhan et al. | |
| 2015/0278912 A1* | 10/2015 | Melcher | H04W 76/14 |
| | | | 705/26.7 |
| 2015/0302510 A1* | 10/2015 | Godsey | G06Q 30/0635 |
| | | | 705/26.81 |
| 2015/0329260 A1 | 11/2015 | Singh | |
| 2016/0019780 A1 | 1/2016 | Gettings et al. | |
| 2016/0040580 A1 | 2/2016 | Khaled et al. | |
| 2016/0132821 A1 | 5/2016 | Glasgow et al. | |
| 2016/0203431 A1* | 7/2016 | Renfroe | G06Q 50/12 |
| | | | 705/7.25 |
| 2016/0314514 A1* | 10/2016 | High | G06Q 30/0631 |
| 2017/0201057 A1 | 7/2017 | Ahlawat et al. | |
| 2017/0300984 A1 | 10/2017 | Hurwich | |
| 2018/0053140 A1* | 2/2018 | Baca | G01N 33/02 |
| 2018/0260779 A1 | 9/2018 | Singh et al. | |
| 2018/0308514 A1 | 10/2018 | Li et al. | |
| 2019/0108483 A1 | 4/2019 | Tineo | |
| 2020/0105409 A1 | 4/2020 | Kochar et al. | |

OTHER PUBLICATIONS

Li, X., et al., "Discussion of Principle and Application for Internet of Things," Applied Mechanics and Materials, vols. 347-350, pp. 3322-3325, 2013 (Year: 2013).*

"Amazon Dash Replacement for Developers", XP054979476, Available online at URL: https://www.youtube.com/watch?v=WS42WcuSyVU, Jan. 30, 2017, 4 pages. (Year: 2017).*

U.S. Appl. No. 15/696,040, titled "Sensor Data-Based Reordering of Items," filed Sep. 5, 2017.

"Amazon Dash Replenishment", XP054979477, Available online at URL:https://www.youtube.com/watch?v=vTYcWG 6BIDY, Jan. 19, 2016, 3 pages.

"Dash Replenishment Service CX Guidelines", Dash Replenishment Service, XP055598411, Available online at URL:https://web.archive.org/web/20171208012109/https://developer.amazon.com/docs/das h/customer-experience-guidelines.html, Dec. 8, 2017, 9 pages.

"Dash Replenishment Service Glossary", Dash Replenishment Service, XP055598456, Available online at: URL:https://web.archive.org/web/20171208041422/https://developer.amazon.com/docs/dash/glossary.html, Dec. 8, 2017, 6 pages.

"Frequently Asked Questions", Dash Replenishment Service, XP055598417, Available online at URL:https://web.archive.org/web/2017120801 2934/https://developer.amazon.com/docs/das h/faqs.html, Dec. 8, 2017, 5 pages.

"GetOrderInfo Endpoint", Dash Replenishment Service, XP055598458, Available online at URL:https://web.archive.org/web/2017120804 1609/https://developer.amazon.com/docs/dash/getorderinfo-endpoint.html, Dec. 8, 2017, 6 pages.

"Notification Messages (DRS)", Dash Replenishment Service, XP055598457, Available online at URL:https://web.archive.org/web/2017120804 1525/https://developer.amazon.Gom/docs/dash/notification-messages.html, Dec. 8, 2017, 14 pages.

"SlotStatus Endpoint", Dash Replenishment Service, XP055598461, Available online atURL:https://web.archive.org/web/20171208041548/https://developer.amazon.com/docs/dash/slotstatus-endpoint.html, Dec. 8, 2017, 7 pages.

PCT/US2019/022226, "International Search Report and Written Opinion", dated Jul. 2, 2019, 14 pages.

U.S. Appl. No. 15/918,205, titled "Managing Shipments Based on Data From a Sensor-Based Automatic Replenishment Device," filed Mar. 12, 2018.

U.S. Appl. No. 15/926,779, titled "Product Specific Correction for a Sensor-Based Device," filed Mar. 20, 2018.

U.S. Appl. No. 15/927,324, titled "Managing Electronic Requests Associated With Items Stored by Automatic Replenishment Devices," filed Mar. 21, 2018.

U.S. Appl. No. 15/927,946, titled "Automatic Replenishment of Items Utilizing a Sensor-Based Device," filed Mar. 21, 2018.

U.S. Appl. No. 15/927,998, titled "Predictive Consolidation System Based on Sensor Data," filed Mar. 21, 2018.

U.S. Appl. No. 15/928,370, titled "Product and Lid Identification for Sensor-Based Device," filed Mar. 22, 2018.

U.S. Appl. No. 15/928,409, titled "LED Enhanced Product and Lid Identification for Sensor-Based Device," filed Mar. 22, 2018.

U.S. Appl. No. 15/934,780, titled "Test-Enabled Measurements for a Sensor-Based Device," filed Mar. 23, 2018.

U.S. Appl. No. 15/963,761, titled "Sensor-Related Improvements to Automatic Replenishment Devices," filed Apr. 26, 2018.

Griffiths, "Never Run Out of Food Again! Smart Mat Warns You When You're Low on Milk While Fridge Cam Lets you Remotely Check What you Already Have During your Weekly Shop," Available online at http://www.dailymail.co.uk/sciencetech/article-3385278/Never-run-food-Smart-mat-tells-low-milk-fridge-cam-shows-s-inside-shopping.html, Jan. 5, 2016, 8 pages.

PCT/US2019/022215, "International Search Report and Written Opinion", dated Apr. 29, 2019, 11 pages.

* cited by examiner

ORDER QUANTITY AND PRODUCT RECOMMENDATIONS BASED ON SENSOR DATA

BACKGROUND

Online retailers as well as brick and mortar retailers offer subscription services that deliver items to users on a periodic basis. However, services such as subscriptions can deliver items even when an amount of the item is remaining resulting in a build-up of the item in a user's home or work place. Further, static subscription and delivery services fail to account for varied use of the item by the user. For example, a user may utilize an unusual amount of an item (e.g., more than they usually do) and be left to either wait for the next delivery or to visit a retailer to resupply the item. Interacting with user interfaces or visiting web sites of retailers to modify a subscription can be time consuming and confusing resulting in the user either receiving too much of an item or be left with not enough of the item in between deliveries. In addition, users may not remember that a certain item needs to be removed from a subscription based on items purchased from a recent trip to a retailer or changing circumstances such as a family gathering or going on a vacation trip.

BRIEF DESCRIPTION OF THE DRAWINGS

Various embodiments in accordance with the present disclosure will be described with reference to the drawings, in which.

DETAILED DESCRIPTION

Figure 1:
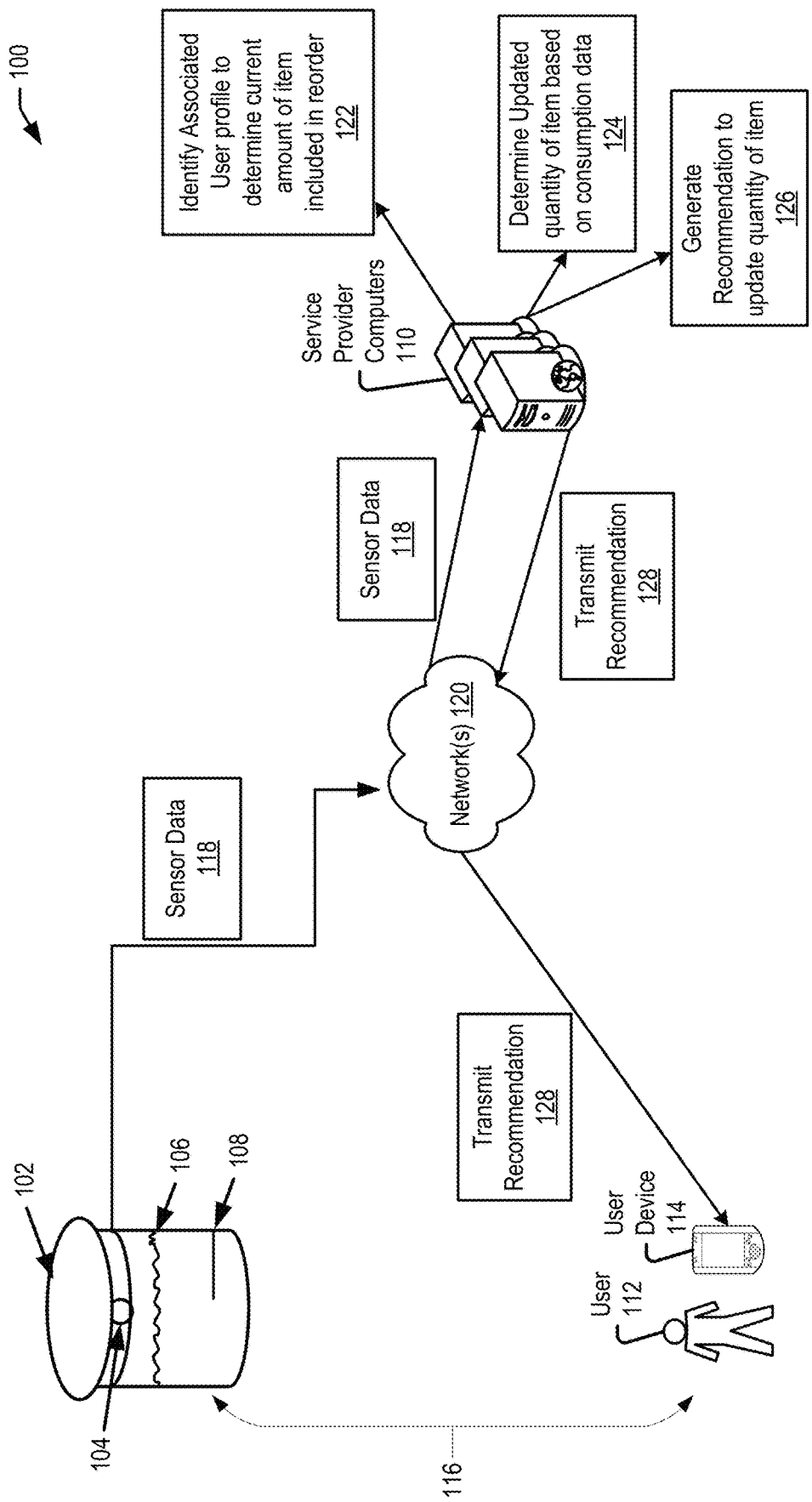
FIG. 1 illustrates a workflow for a sensor based recommendation feature that includes service provider computers, an automatic replenishment device (ARD), and a user device, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide a sensor-based recommendation feature for utilizing data captured or obtained by an automatic replenishment device (ARD) to generate new product recommendations for a user associated with the ARD via online, mobile, or in-store advertisements, suggestions to add items to a user's shopping cart, or recommendations to change the quantity or configuration of an item to ensure a user does not run out between deliveries of that item, identifying relationships between items, some of which are associated with an ARD and some which are not associated with an ARD, to generate a reorder recommendation for the items not associated with the ARD based at least in part on the consumption data from the items associated with the ARD, generating product recommendations for users which may not be associated with or utilize an ARD based on consumption data of a user who is associated with an ARD and has similar characteristics or properties as the users that are not associated with an ARD, or generating recommendations for updating a reorder threshold for an item and ARD based on aggregate data from other users. The ARD may be a pad, mat, or shelf in which items (e.g., office supplies, toiletries, dog food, or consumable items generally) are placed on a surface of the ARD, or a container in which the items are placed within the container. A sensor (e.g., a weight sensor) of the ARD may be placed within or on a surface of the ARD and be configured to periodically obtain weight measurements or property measurements (e.g., weight, volume, mass, etc.) of the items that are placed on the surface of the ARD. The weight measurements decreasing over time or the property measurements changing over time may indicate an extent to which a user is removing the items from the ARD and using/consuming the items. In some embodiments, the ARD may be a container with a sensor located on an interior surface of the container in which items are placed within the container. A sensor (e.g., time of flight sensor) of the ARD may be configured to periodically obtain distance measurements (or property measurements including any electronic signal technology that can determine an elapsed time period between transmission of a signal from a source and a return of the signal) from the sensor to an item stored within the container. The distance measurements increasing over time may indicate an extent to which a user is removing the items from the ARD and using/consuming the items. In embodiments, the sensors may include radio frequency identifier (RFID) sensors, near field communication (NFC) sensors, or one or more sensors configured to utilize computer vision techniques to identify a change in a quantity of an item associated with an ARD.

The sensor data obtained by the sensor(s) (e.g., weight measurements, distance measurements, or property measurements) of the ARD may be communicated via an available network (e.g., the Internet) such as a WiFi network or cellular network to service provider computers (service provider computer) that analyze the sensor data to determine consumption data. In embodiments, the service provider computer may be configured to utilize the raw sensor data obtained by the sensor(s) of the ARD to determine a consumption rate or consumption data of an item associated with an ARD. In embodiments, the service provider computer implements the sensor based recommendation feature described herein. In accordance with at least one embodiment, the consumption data for an item and a user may be maintained in a corresponding user profile for the user and analyzed to determine a consumption rate for the item associated with the ARD. In some embodiments, recommendations for increasing or decreasing an amount of the item for automatic reordering may be generated based at least in part on the consumption data. In various embodiments, recommendations for ordering one or more other items, either related items or not related, for automatic reorder may be generated based at least in part on the consumption data.

The processes and systems described herein may be an improvement on conventional reordering systems and/or subscription services. For example, conventional reordering or subscription services fail to dynamically adjust based on the usage pattern of the item which may fluctuate according to various circumstances around a user consuming an item. To further illustrate, a bi-weekly order of tortilla chips may be of little use to a chip enthusiast the day after they throw a party and all the chips are consumed as depending on the day all the chips are consumed by the guests, the enthusiast may have to wait almost two weeks for a delivery of the tortilla chips. Further, conventional subscription packages or reordering services may statically deliver items to a user even when they are not needed (e.g., the user consumed far less of an item than past usage would indicate) resulting in an unnecessary stockpile of the item being stored at a user's location. In addition, conventional systems provide inefficient methods and processes for updating automatic reorders or subscriptions. For example, a user may have to interact with a subscription modification interface that includes multiple interface objects and burdens the user with guessing an appropriate cadence of delivering the item. This places the onus on the user to keep track of the current consumption, guess their future consumption, and provide an appropriate delivery cadence or else be faced with an overstock or understock of the item.

The methods and systems described herein provide for more efficient and automatic reordering of items on behalf of the user by utilizing the consumption data obtained by the ARD. As described herein, the sensor based recommendation feature may utilize the consumption data to update a quantity of an item such that a user avoids running out of the item prior to a next delivery or reducing the quantity of the item such that the user avoids overstocking the item prior to the next delivery. Further, order history or purchase history of other items that are not associated with an ARD may be utilized with the consumption data of an item that is associated with an ARD to infer reordering relationships between items that would otherwise be undiscovered using conventional recommendation algorithms. Recommendations to add these other items that are not associated with an ARD to an automatic reorder process for an item that is associated with an ARD can be achieved using the newly formed relationships between the items. Moreover, recommendations for items can be generated for users not associated with or utilizing an ARD based on consumption data from users that are utilizing an ARD based on similarities between the users. For example, users with similar demographic information may benefit from recommendations about an item associated with an ARD even though they are not utilizing an ARD based on the consumption data of the users associated with an ARD item combination. Conventional reordering devices lack an ecosystem of recommendations that can utilize the consumption data derived from the sensor data as one new data point for generating recommendations. For example, conventional reordering systems may only provide usage data for a given item without any discovery of item relationships or user relationships that can be derived from the consumption data or aggregate consumption data from a plurality of ARDs. Moreover, conventional reorder systems may be configured to perform analysis and reordering on the device itself which causes the devices to be more expensive and less efficient as they utilize more power from associated power sources to analyze sensor data and reorder items. The systems and methods described herein include embodiments where the ARD captures the sensor data and transmits the sensor data to a service provider computer via available networks thereby reducing the load and stress on the components of the ARD and utilize less power. As described herein, the service provider computers may analyze the sensor data to determine a consumption rate or consumption data which can be further utilized to generate recommendations.

In accordance with at least one embodiment, the service provider computer may determine a reorder threshold associated with an item. The reorder threshold may be based on the item itself (e.g., expiration dates), consumption patterns of the user (e.g., based on the consumption data obtained by the sensors of the ARD), consumption patterns of other users (e.g., based on the consumption data obtained by sensors of aggregate ARDs), or specified by the user themselves. Instead of a user having to remember to reorder an item when the amount of the item or supply of the item is low or exhausted, the service provider computers may utilize the consumption data and reorder threshold to automatically reorder the item for delivery. For example, when the consumption data determined from the weight data obtained by the sensor(s) of the ARD is equal to or below the reorder threshold, the item may be ordered and delivered to a user. By utilizing the consumption data in this fashion, the system can dynamically adjust the automatic reorder of the item resulting in the user receiving additional inventory of the item prior to the user's supply of the item being depleted. In embodiments, a service provider computer implementing the sensor based recommendation feature may maintain aggregate data obtained from aggregate ARDs and associated sensors. For example, aggregate sensor data, consumption data, or reorder thresholds generated from sensor data of a plurality of ARDs associated with a particular item or different items may be maintained by the service provider computer. In accordance with at least one embodiment, the sensor based recommendation feature may include generating a recommendation to update a reorder threshold for a particular ARD/item pair for a user based on aggregate consumption data from other ARDs associated with the same item, a different item, or based on similarity between characteristics of the users associated with the ARDs.

In some embodiments, when the consumption data determined from the distance measurement data obtained by the sensor(s) of an ARD indicates that a current level of the item in the container ARD is equal to or below the reorder threshold, the service provider computers may automatically reorder and deliver additional inventory for the item to a location associated with the user (e.g., a home or workspace). In accordance with at least one embodiment, the ARD is configured to periodically transmit the sensor data and other information associated with the ARD such as an associated item ID, an ARD ID, or an item tag ID to the service provider computer. In embodiments, the sensor data may include or be accompanied with the item ID, an ARD ID, or an item tag ID as described in U.S. patent application Ser. No. 15/696,040 filed Sep. 5, 2017 entitled "SENSOR DATA-BASED REORDERING OF ITEMS' of which the full disclosure is incorporated herein by reference. In some embodiments, a user profile and a corresponding user may be associated with one or more ARDs where the user profile includes consumption data and ARD identification (ID) for each ARD and corresponding item (e.g., one ARD may be linked or associated with cookies while another ARD is associated with facial tissues). In accordance with at least one embodiment, a user may be notified of a reorder recommendation or automatic reorder for an item based on the consumption data for a corresponding item and ARD. According to user preferences, a reorder may only be instructed for delivery upon a consent of the user such as the user interacting, via a corresponding user device, with the notification to process the reorder.

FIG. 1 illustrates a workflow for a sensor based recommendation feature that includes service provider computers, an automatic replenishment device (ARD), and a user device, in accordance with at least one embodiment. The workflow 100 of FIG. 1 includes an automatic replenishment device (ARD) 102 that includes a sensor 104. In FIG. 1, the depicted ARD 102 includes a sensor 104 that may be a time of flight sensor that is configured to determine a distance from the sensor 104 to a surface area of an item, such as item level 106 (e.g., current item level) stored within the ARD 102. A visual representation of the reorder threshold 108 is depicted in the ARD 102 for purposes of clarification and explanation of the sensor based recommendation feature with reference to FIG. 1. However, it should be understood that the ARD may not be configured to visually display the reorder threshold. Instead, the reorder threshold may be some distance measurement with respect to the time of flight sensor 104 or a weight measurement with respect to another type of sensor of the ARD 102 that is maintained by the service provider computers 110. The ARD 102 represents a container ARD that includes a sensor such as sensor 104 that is located in or on an interior surface of the ARD 102 such that the time of flight data may be obtained with respect to the distance from the sensor 104 to the surface area of an item or current level of the item 106. Obtaining or capturing the distance measurement information from the sensor 104 to a current item level 106 of an item stored within ARD 102 is discussed further with reference to FIG. 3.

The workflow 100 of FIG. 1 includes a user 112 utilizing a user device 114. The user 112 may be associated 116 with the ARD 102. It should be noted that although the workflow 100 of FIG. 1 illustrates the user 112 being associated with a single ARD 102, in embodiments a user may be associated with a plurality of ARDs in one or more locations. For example, a given user may be associated with three ARDs in their home and two ARDs at their workplace. The workflow 100 of FIG. 1 depicts the ARD 102 transmitting the sensor data 118 via networks 120 to service provider computers 110. In accordance with at least one embodiment, the ARD 102 includes communication components, such as a WiFi component, for transmitting the sensor data 118 (data obtained by sensor 104) periodically to the service provider computers 110 via networks 120. In embodiments, periodic transmission of the sensor data 118 may occur at various intervals of minutes, hours, days, or weeks. In embodiments, the service provider computers 110 may be configured to facilitate the automatic reordering of an item associated with ARD 102 on behalf of the user 112 based at least in part on the sensor data 118.

In embodiments, the workflow 100 of FIG. 1 depicts the service provider computers 110 identifying an associated user profile of user 112 at 122. In accordance with at least one embodiment, the user profile 122 of user 112 may include purchase history information for the user 112, as well as information about the ARD 102 and the associated item of ARD 102 (e.g., oats or chips), a reorder threshold such as reorder threshold 108 for the item, and a quantity of the item that is automatically reordered on behalf of the user 112 upon the current level of the item 106 being equal to or below the reorder threshold 108 as determined by the sensor data 118. The sensor data 118 may include an ARD ID and item ID that enables the service provider computers 110 to identify the appropriate user profile at 122 as well as the corresponding user 112. In embodiments, the service provider computers 110 maintain the associations between the user profiles, the ARD 102, and user 112 as well as the item associated with the ARD 102 and reorder threshold for the item and ARD 102. In embodiments, the user 112 may disassociate the ARD 102 from a first item and associate the ARD 102 with another item by inputting information data, via user device 114, to a website, native application of user device 114, or a mobile application.

The workflow 100 of FIG. 1 depicts the service provider computers 110 determining an updated quantity of the item based on the sensor data 118 at 124. For example, the sensor data 118 may be analyzed to determine consumption data or a consumption rate that identifies a usage or consumption of the item associated with ARD 102 such that the current item level 106 will fall below or equal the reorder threshold prior to the automatic reorder being delivered to the user given a current amount of the item. To further illustrate the example, the user 112 may order and store twelve eggs in ARD 102 which is currently being reordered and delivered once a week based on previous consumption data. However, current sensor data 118 indicates that at their current rate of use (e.g., determined consumption rate or data based on the sensor data 118), the user will run out of eggs prior to the order and delivery. The service provider computers 110 may determine that if the quantity of the item was updated from twelve eggs to eighteen eggs, the user 112 would not run out of eggs in between deliveries. Upon determining the updated quantity of the item based on the consumption data or rate as determined from the sensor data 118 at 124, the service provider computers 110 may generate a recommendation 126 to update the quantity of the item. In embodiments, the reorder threshold or threshold value may correspond to a remaining weight (e.g., 1 pound, 5 ounces, etc.) or a remaining number (e.g., 2, 5, or 8 eggs, etc.) of the item that is associated with the ARD 102. The reorder threshold may correspond to a remaining percentage of the item associated with the ARD 102 (e.g., 20%, 30%, etc.) in view of a previous distance from the sensor to the surface area of the item or a previous weight of the item that was placed on the ARD which is described more with reference to FIG. 2.

The ARD 102 may communicate or transmit the sensor data 118 via associated communication components (not pictured) by providing Bluetooth signals, WiFi signals, cellular signals, or by utilizing other communication protocols to communicate via networks 120 to service provider computers 110. In some embodiments, the sensor data 118 and other associated data (e.g., ARD ID, user ID, item ID information, etc.) may be relayed via user device 114 to service provider computers 110 via networks 120. The sensor data 118 may be utilized to determine a consumption rate or consumption data for the item associated with ARD 102 which in turn may be utilized to automatically reorder the item associated with ARD 102 without direct user 112 action in initiating the reorder other than the user 112 placing the item in the ARD 102 or on the ARD 102 (with reference to FIG. 2). The sensor data 118 may be utilized to determine a consumption rate for the item associated with ARD 102 that indicates that the user may benefit from automatically updating a quantity included in the reorder for the item stored in ARD 102 as well as recommend other items not associated with the ARD 102 for automatic reorder on behalf of the user. The workflow 100 of FIG. 1 includes transmitting the recommendation at 128, via networks 120, to user device 114 that is associated with user 112. In embodiments, the recommendation 128 may be transmitted as a notification, a user interface object for a mobile application or a native application of user device 114, a data object for a web browser of user device 114, an email, or a short message service (SMS) text message. In accordance with at least one embodiment, the user 112 may interact with user device 114 to consent or confirm the update of the quantity of the item associated with ARD 102. According to user preferences of user 112 that are maintained in the user profile 122, the updated quantity of the item may be automatically modified and the item may be reordered without confirmation or interaction by the user 112 with the recommendation 128 via user device 114.

It should be noted that although FIG. 1 depicts ARD 102 storing an item to obtain sensor data with sensors 104 to determine consumption data, in some embodiments the sensors 104 may be associated with a feature in a location that is separate from the ARD 102 or a container of any type that is configured to obtain the sensor data 118. For example, a container may store an item and an external sensor, such as sensor 104 may be associated with or otherwise affixed or associate within a certain distance of the container storing the item and be configured to obtain the sensor data (e.g., distance measurements) which can be transmitted, via networks 120, to service provider computers 110 for enabling the sensor based recommendation features described herein. In accordance with at least one embodiment, the service provider computers 110 may generate a recommendation to update a reorder threshold 108 for the item associated with ARD 102 based on aggregate sensor data or consumption data maintained by the service provider computers 110. The service provider computers 110 may utilize the consumption data 124 of the ARD 102 and aggregate consumption data from derived from sensor data of other ARDs to compare to a threshold to determine whether the reorder threshold 108 should be updated for the ARD 102 and associated item. In accordance with at least one embodiment, the service provider computers 110 may specify the threshold based on the item, the user, other user attributes or characteristics such as user profile information. In some embodiments, a user may specify the threshold for updating the reorder threshold 108 based on aggregate consumption data.

Figure 2:
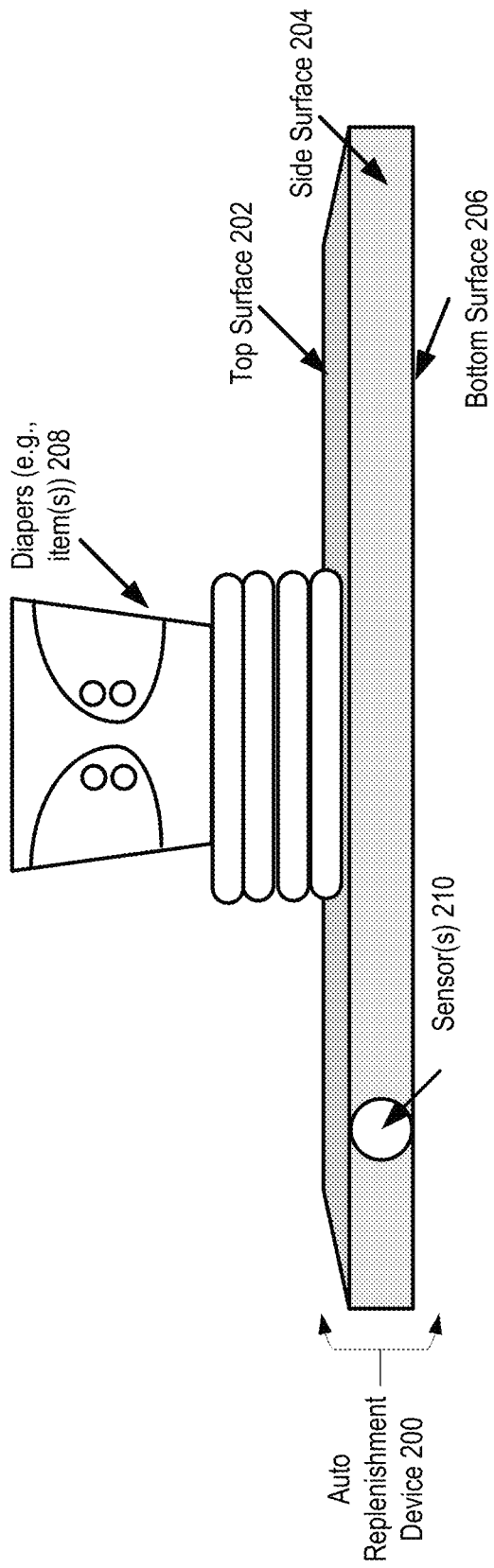
FIG. 2 illustrates an example ARD and items placed on the ARD, in accordance with at least one embodiment.

FIG. 2 illustrates an example ARD and items placed on the ARD, in accordance with at least one embodiment. FIG. 2 includes ARD 200 which may have a top surface 202, a side surface 204, and a bottom surface 206. One or more items, such as diapers 208 may be placed on the top surface 202 of the ARD 200. The ARD 200 may be an example of the ARD 102 from FIG. 1. For the purposes of FIG. 2, although the items 208 may be any type of product or item, the item 208 is diapers. The bottom surface 206 may be in contact with a flat or substantially flat surface, such as a counter, table, or shelf. It should be noted that although the ARD 200 of FIG. 2 represents a shelf which may be of any shape, depth, or size, the ARD 200 may be a mat or pad in which items 208 are placed thereon. In embodiments, the ARD 200 may include one or more sensor(s) 210. The sensors 210 may be configured to determine a weight of the items 208 that are currently placed on the top surface 202 of the ARD 200 (i.e., capture or obtain weight measurements of the items 208). The sensors 210 may include a weight sensor (e.g., a load sensor, a strain gauge on a load cell, etc.), that is configured to determine/detect a weight/mass of items 208 placed on the top surface 202 of the ARD 200. In accordance with at least one embodiment, the weight of the items 208 (e.g., sensor data, weight measurements, or property measurements) may include the raw data that was obtained by the sensors 210 and ARD 200 that represents a current weight/mass of the items 208 that are situated on the top surface 202 of ARD 200. The weight measurements may indicate a current weight/mass of the items 208, item volume data that indicates a current volume of the items 208, and/or item number/quantity data that indicates a number or quantity of the items 208 situated on the reorder device 200.

As described herein, the ARD 200 may be configured to transmit, via available networks, the weight measurements or other data captured by sensors 210 about items 208 to a service provider computer implementing the sensor based recommendation feature. In accordance with at least one embodiment, the weight measurements may be utilized by the service provider computers to determine consumption data or a rate of consumption by a user associated with ARD 200 of the items 208. The consumption data or rate of consumption may be utilized to generate recommendations to enhance the automatic or non-automatic order and delivery of items on behalf of a user without the user having to take any action or provide any indication regarding their consumption. For example, the service provider computer (110 of FIG. 1) may identify that the current consumption rate for the diapers (items 208) indicates that the user will run out of the diapers prior to receiving a next order given the current item quantity associated with items 208 (e.g., currently receiving an order for twenty diapers). A recommendation may be generated that identifies an update to the quantity such as from twenty diapers to twenty-five diapers resulting in the user not running out of diapers between deliveries. In embodiments, the service provider computer may generate a recommendation for other items not associated with the ARD 200 based on information included in an associated user profile (e.g., purchase or order history for the other items, user preferences, on-going specials or deals, etc.). The service provider computers may utilize the consumption data derived from the sensor data obtained by sensor 210 and ARD 200 for to generate one or more recommendations for the diapers (items 208) for users not associated with an ARD such as ARD 200 based on similar characteristics or properties between the users.

Figure 3:
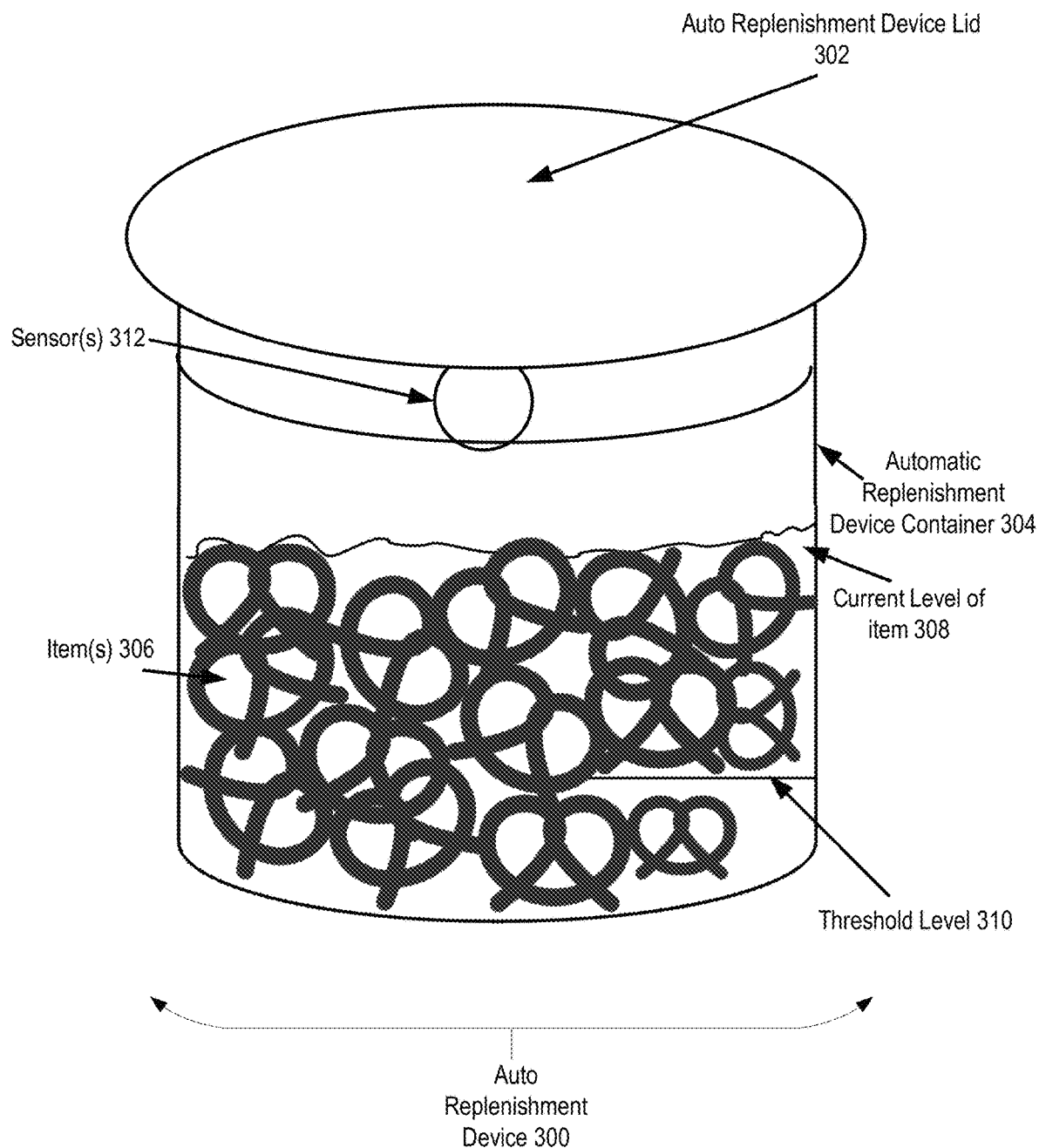
FIG. 3 illustrates an example ARD with items placed within the ARD, in accordance with at least one embodiment.

FIG. 3 illustrates an example ARD with items placed within the ARD, in accordance with at least one embodiment. FIG. 3 includes ARD 300 that includes an ARD lid 302, and an ARD container 304. One or more items 306, represented by pretzels in FIG. 3, may be stored within the ARD container 304. FIG. 3 also includes visual representations for a current level of the item 306 at 308 and a threshold level 310. It should be noted that although the ARD 300 of FIG. 3 includes visual representations of a current level of item at 308 and a threshold level 310, these depictions are for clarification of aspects of the embodiments described herein. For example, a current level of item 308 may be determined by service provider computers based on sensor data obtained by sensors 312 and maintained in a user profile that is generated and stored by the service provider computers. As described herein, the threshold level may be determined by the service provider computers based on the consumption data that is derived from the sensor data obtained by the sensors 312 where the threshold level 310 is stored and associated with a user profile maintained by the service provider computers.

It should be noted that the ARD 300 of FIG. 3 represents a container which may be of any shape, depth, or size, in which items 306 are placed within. In embodiments, the ARD 300 may include one or more sensor(s) 312 that may be configured to determine a distance of the items 306 that are currently placed within the ARD container 304 of the ARD 300 (i.e., capture or obtain distance measurements of the items 306). The sensors 312 may include a time of flight sensor (e.g., a time of flight camera, a time of flight transmitter and receiver combination, etc.), that is configured to determine/detect a distance/amount of items 306 placed in the ARD container 304 of the ARD 300 based at least in part on the time of flight for a signal to be emitted from the sensors 312 to a current level of the item 306 (e.g., 308) or to a surface area of the items 306. In accordance with at least one embodiment, the distance measurements of the items 306 to the sensors 312 (e.g., sensor data, distance measurements, or property measurements) may include the raw data that was obtained by the sensors 312 and ARD 300 that represents a current distance/amount of the items 306 that are situated within the ARD container 304 of ARD 300 from the sensors 312 and the items 306.

The distance measurements may indicate a current distance/amount of the items 306, item volume data that indicates a current volume of the items 306, and/or item number/quantity data that indicates a number or quantity of the items 306 situated in the ARD container 304 of ARD 300. The ARD 300 and sensors 312 may be configured to utilize any suitable time of flight signal technology between the sensors 312 and the items 306 within the ARD container 304. Although the ARD 300 of FIG. 3 includes the sensors 312 within or on a surface of the ARD lid 302, the sensors 312 may be placed on one or more interior surfaces of the ARD container 304. Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between the sensors 312 and items 306 (e.g., current level of item 308) utilizing a source/detector or transmitter/receiver. In embodiments, the service provider computers may be configured to determine a distance from the sensors 312 and items 306 (e.g., current level of item 308) using the sensor data obtained by the sensors 312.

For example, the elapsed time period between the transmission of a signal from a source to detection of the signal (e.g., from the sensors 312), or at least a portion thereof, at a detector or receiver, along with the known speed of the signal (e.g., the speed of light) may be utilized to determine the distance between the source of the signal (e.g., sensors 312) and the items 306. As described herein with reference to FIG. 2, the ARD 300 may be configured to transmit the sensor data obtained by sensors 312 to the service provider computers for determining the distance between the sensors 312 and the current level of item 308 and correlate the distance to an amount of item left in the ARD container 304 of ARD 300. The sensor data may be used to determine the consumption data or consumption rate of items 306 and in embodiments reorder the items 306 upon the amount of the item being equal to or less than the threshold level 310. In accordance with at least one embodiment, the consumption data or consumption rate information may be utilized by the service provider to generate one or more recommendations such as updating a current reorder quantity for an item such as items 306 to provide enough of items 306 to the user between deliveries such that the user does not exhaust the supply of items 306 between deliveries. Recommendations for other items not associated with an ARD may be generated based on information included in the user profile for a user (e.g., order or purchase history, user preferences, etc.) that reflect relationships derived between the consumption rate of the items 306 of ARD 300 and the other items that are not associated with an ARD by the service provider computers.

Figure 4:
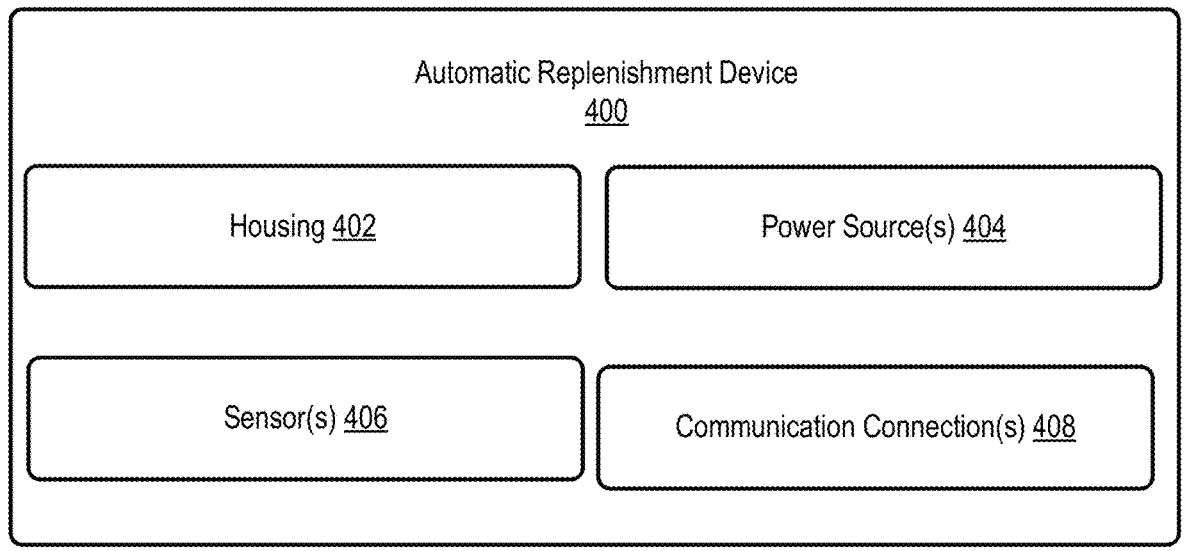
FIG. 4 illustrates a block diagram of components of an ARD, in accordance with at least one embodiment.

FIG. 4 illustrates a block diagram of components of an ARD, in accordance with at least one embodiment. The ARD 400 of FIG. 4 may be an example of the ARD 102, 200, or 300 of FIGS. 1-3. The ARD 400 may include a housing 402 that may include components of ARD 400 such as power source 404, sensors 406, and communication connections 408. In embodiments, the housing 402 may be composed of any type of material (e.g., plastic, metal, etc.), and may server to prevent the components of the ARD 400 from being damaged or interacting or otherwise contaminating the items placed on or within ARD 400. The ARD 400 may include one or more power source(s) 404 that provide power to one or more components of the ARD 400. The power sources 404 may include a battery, which may include a one-time use battery or a rechargeable battery. However, the power sources 404 may rely on power from another source providing alternating current (AC) power and may be a power inverter. For example, the ARD may be powered via a power cord that is coupled to the ARD 400 and that is detachably connected to a power outlet, such as a wall outlet. In some embodiments, the ARD 400 may include a power level detector that is configured to determine and display a power level for the ARD using alpha-numeric characters that indicate a current power level of a battery of the ARD 400 and power sources 404.

In embodiments, the ARD 400 may include one or more sensors 406 such as a weight sensor 210, a time of flight sensor 312, or other suitable sensors such as time of flight camera sensors, scale sensors, or infrared sensors that are configured to obtain or capture sensor data of items placed within or on ARD 400. In embodiments, the weight sensors may include one or more load cells, such as hydraulic load cells, pneumatic load cells, strain gauge load cells, and/or piezoelectric load cells. The time of flight sensors may include signal transmitters and receivers that are configured to determine an amount of an item stored within the ARD 400 or calculate a distance from the source of the signal to the receptor of the signal which can be converted into an amount of the item stored in the container ARD 300. The sensors 406 may include microelectromechanical systems (MEMS) pressure sensors that are configured to detect whether items are situated on a top surface 202 of ARD 200 and/or detect an amount (e.g., weight, volume, number/quantity, etc.) of the items 208. The sensors 406 may periodically obtain measurement properties (e.g., weight measurements or distance measurements) at periodic or predetermined intervals such as every day, every hour, every minute, etc. In some embodiments the sensors 406 may be configured to detect/sense when an item has been interact with (e.g., placed on top surface 202 of ARD 200, the ARD lid 302 of ARD 300 is removed, etc.) which causes the sensor 406 to capture the weight measurements or distance measurements.

In embodiments, the ARD 400 may include one or more communication connections 408. The communications may include suitable communication interfaces for communicating via Bluetooth (Bluetooth Low Energy (BLE)), WiFi, a cellular connection (e.g., 3G, 4G, LTE, etc.). The communication connections 408 may be configured to transmit the raw sensor data obtained by sensors 406 to a service provider computer or relay the sensor data to the service provider computer using a proximal user device. Other known or widely used communication protocols may be utilized to transmit the sensor data of sensors 406 to the service provider computer such as a wireless connection (WiFi network), a wired connection to a network, cellular network, short-range or near-field networks (e.g., Bluetooth), infrared signals, local area networks, wide area networks, the Internet, etc.

Figure 5:
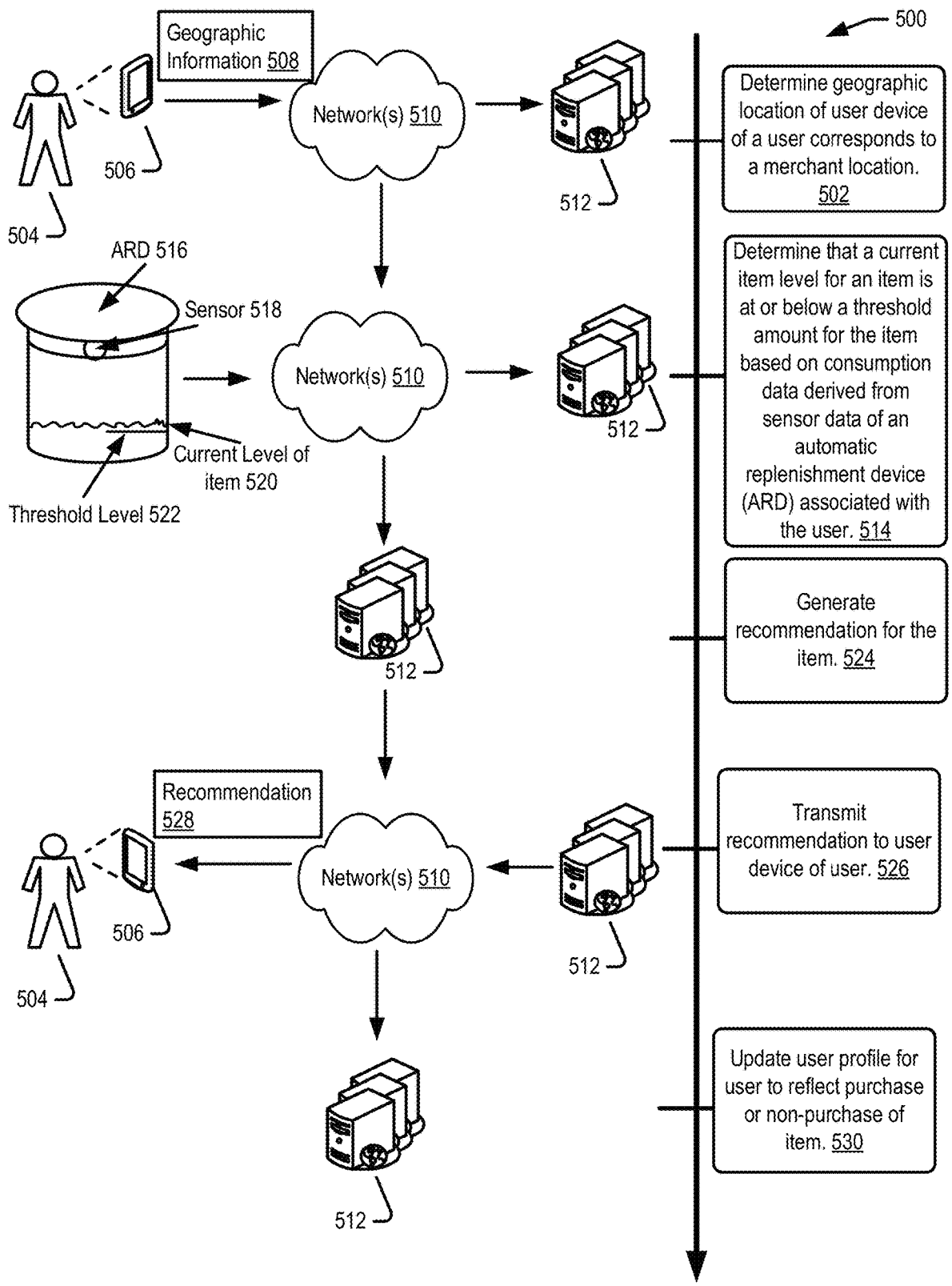
FIG. 5 illustrates a workflow for a sensor based recommendation feature that includes service provider computers, an ARD, and a user device, in accordance with at least one embodiment.

FIG. 5 illustrates a workflow for a sensor based recommendation feature that includes service provider computers, an ARD, and a user device, in accordance with at least one embodiment. The workflow 500 includes determining that geographic location information of a user device associated with a user corresponds to a merchant location at 502. For example, a user 504 utilizing a user device 506 (e.g., a smart phone or tablet computer) may transmit geographic information 508, via networks 510, to service provider computers 512. The service provider computers 512 may be an example of service provider computers 110 of FIG. 1. In embodiments, the user device 506 may include geo-location devices (e.g., a global position system (GPS) device or the like) for obtaining and transmitting the geographic location information or geographic information 508 via networks 510 to service provider computers 512. In accordance with at least one embodiment, the service provider computers 512 may be configured to maintain information that identifies geographic information (e.g., GPS coordinates) that corresponds to merchant locations such as grocery stores, shopping malls, retailers, etc., and compare the geographic information for the merchant location to the received geographic information 508. For example, if the GPS coordinates included in the geographic information 508 correspond or are within a certain distance from the GPS coordinates for a merchant location, the service provider computers 512 may identify that the user 504 and/or user device 506 are within a certain distance or are proximally close to a merchant location.

In embodiments, the workflow 500 includes determining that a current item level for an item is at or below a threshold amount (reorder threshold) for the item based on consumption data derived from sensor data obtained by an ARD associated with the user at 514. For example, an ARD 516 associated with user 504 may periodically transmit sensor data obtained by a corresponding sensor 518 via networks 510 to service provider computers 512. In some embodiments, the service provider computer 512 may be configured to utilize the sensor data to identify a current level of item 520 and compare it to a threshold level or reorder threshold 522. As described herein, service provider computers 512 may determine a consumption rate or consumption data based on the obtained sensor data from sensor 518. The service provider computer 512 may be configured to determine a threshold level 522 based on the determined consumption rate, historic consumption rate, or consumption rate information from other users/ARDs for the same item. In some embodiments, the service provider computer 512 may instruct order and delivery of the item based on the current level of the item 520 being equal to or below the threshold level 522. However, in some embodiments, the service provider computer may utilize the current level of the item 520, the threshold level 522, and the determination that the user 504 is at a merchant location to generate recommendation for the item associated with ARD 516 at 524.

In accordance with at least one embodiment, the workflow 500 may include transmitting the recommendation 524 to a device of the user at 526. For example, the service provider computer 512 may generate an application notification or push notification that includes the recommendation 528 that is configured to be transmitted via networks 510 to user device 506. In embodiments, the user 504 may interact with the recommendation 528, via user device 506, to be notified or informed of the item which they are almost out of (e.g., the item that is stored in ARD 516 based on the current level of the item 520 being at or below the threshold level 522). For example, a recommendation 528 may inform the user 504 that they appear to be at a merchant location, that they are low on an item (eggs), and that they can purchase the eggs at the merchant location. The user 504 may interact with the recommendation 528, via an application of user device 506, to indicate that the item will be purchased, to indicate that the item will not be purchased, or to indicate that they are not at a merchant location. If the user indicates that they will or will not purchase the item, the workflow 500 includes updating the user profile to reflect the purchase or non-purchase of the item at 530. The update of the user profile by service provider computers 512 may include suppressing an order and delivery instruction for the item associated with ARD 516 or the execution of the order and delivery instruction for the item associated with ARD 516 based on the response by the user 504 with the recommendation 528. In accordance with at least one embodiment, the service provider computer 512 may maintain a list, a catalog, or other suitable item mapping for a plurality of merchant locations that may be updated periodically to determine whether the item that is low (e.g., based on the current level of the item 520 and threshold level 522) is available for purchase at the given merchant location. In embodiments, the recommendation 528 may include deals, coupons, offers, or other incentivizing programs that are appropriate for the user 504 (e.g., directed to the item associated with the ARD 516 or directed to related items whose relationship to the ARD item is based on the consumption data of the item associated with the ARD 516).

Figure 6:
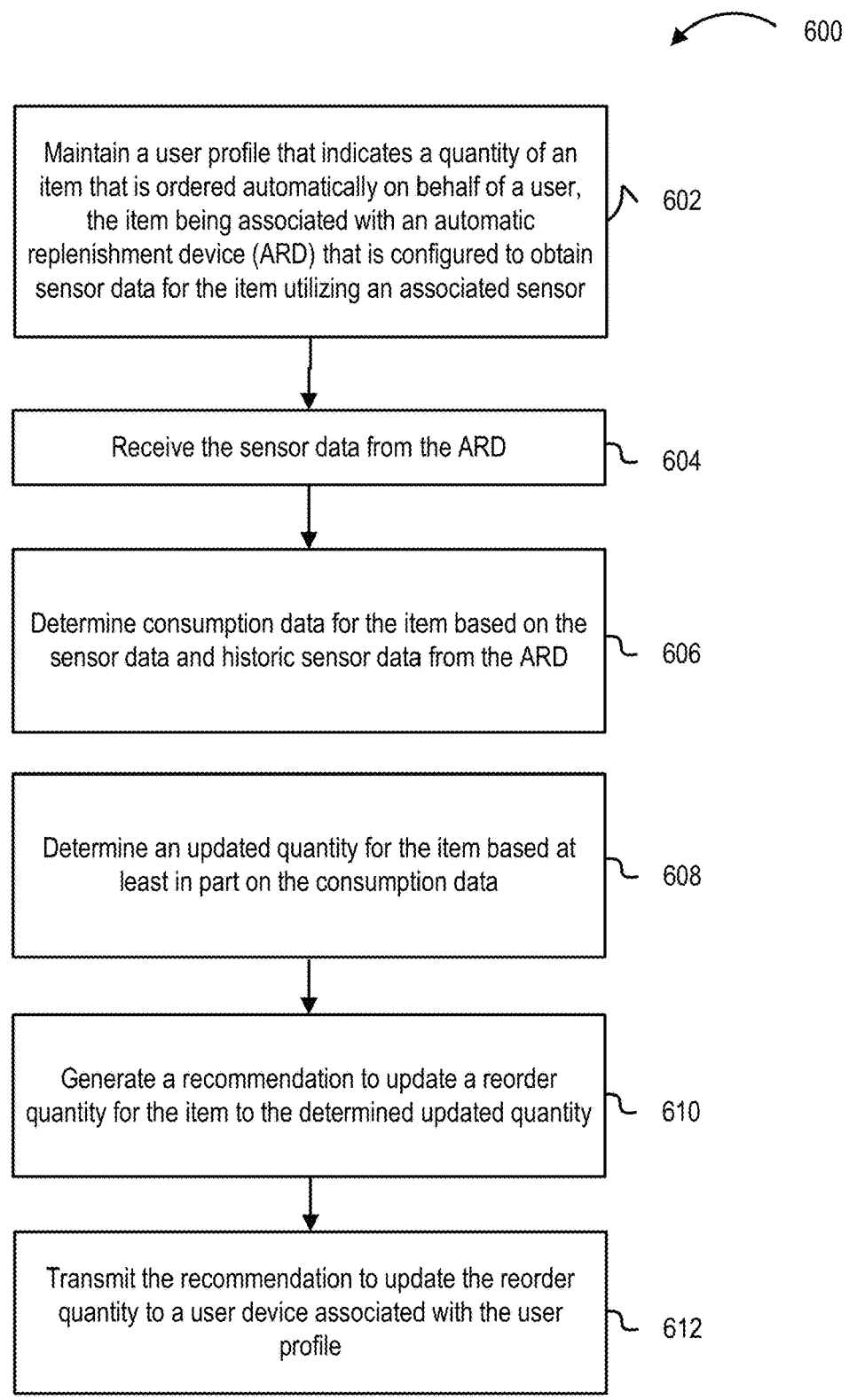
FIG. 6 illustrates a flow diagram of a process for a sensor based recommendation feature, in accordance with at least one embodiment.
Figure 7:
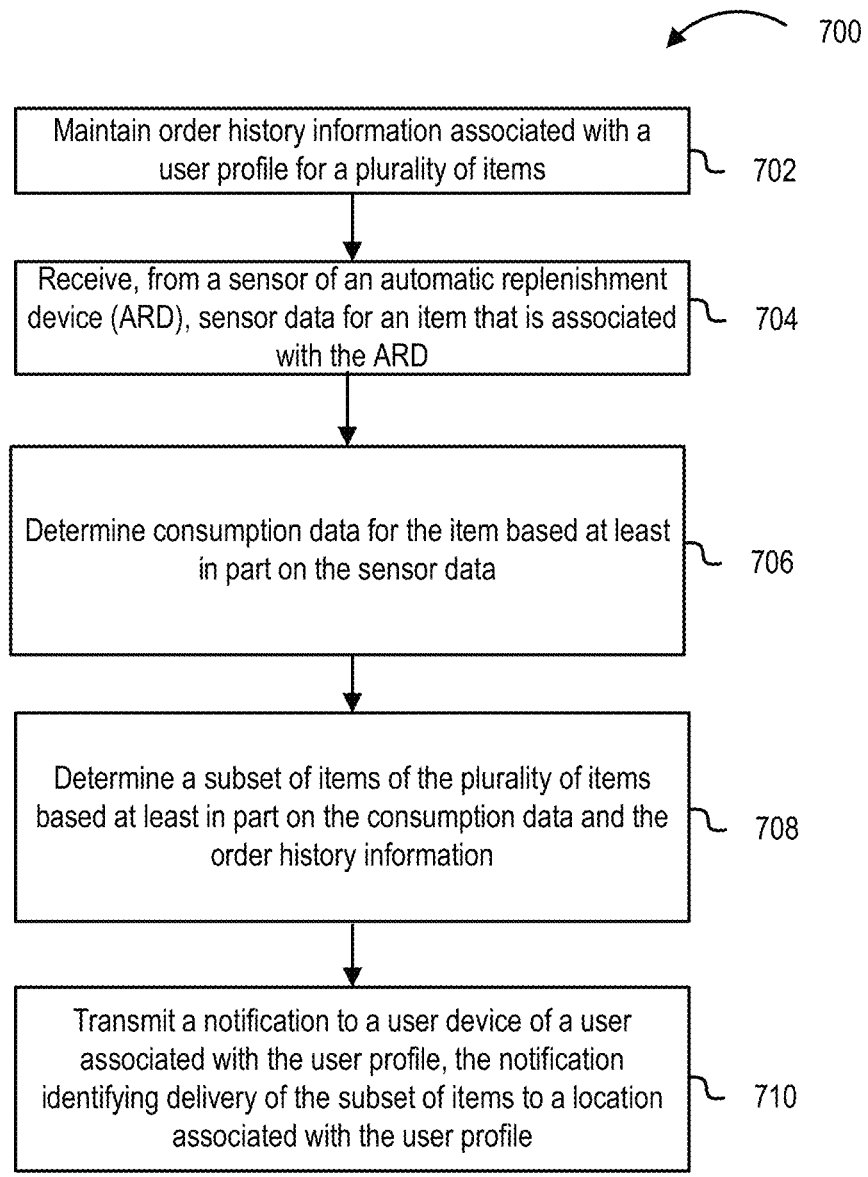
FIG. 7 illustrates a flow diagram of a process for a sensor based recommendation feature, in accordance with at least one embodiment.

FIGS. 6 and 7 illustrate example flows for a sensor based recommendation feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the one or more service provider computers 110, 512, or 814 (e.g., utilizing at least one of the sensor based replenishment module 830, and ARDs 102, 200, 300, 400, 516, or 830) shown in FIGS. 1-5 and 8, may perform the processes 600 and 700 of FIGS. 6 and 7. In FIG. 6 the process 600 may include maintaining a user profile that indicates a quantity of an item that is ordered automatically on behalf of a user where the item is associated with an automatic replenishment device (ARD) at 602. In embodiments, the ARD may be configured to obtain sensor data for the item utilizing an associated sensor. For example, the sensor may be a weight sensor that is configured to obtain weight measurements that indicate an amount of weight of an item placed on a top surface of an ARD. As described herein, the ARD may be configured to transmit the sensor data to a service provider computer using available networks such as the Internet and a WiFi connection. The process 600 may include receiving the sensor data from the ARD at 604. In embodiments, a user may be associated with one or more ARDs and a user profile for the user may reflect the associations between the given user and the multiple ARDs. The service provider computer may be configured to maintain and update one or more mappings or associations of ARDs to a user or a plurality of users for a single location or multiple locations.

The process 600 may include determining consumption data for the item based on the sensor data and historic sensor data from the ARD at 606. In embodiments, the consumption data may represent a consumption rate for the item associated with the ARD by the user or associated users derived from the sensor data received at 604. For example, the consumption rate may be a function of decrease in weight measurements over time up to a threshold level or reorder level is reached or exceeded. The process 600 may include determining an updated quantity for the item based at least in part on the consumption data at 608. In accordance with at least one embodiment, the service provider computer may be configured to utilize information included in the user profile (e.g., quantity of an item that is associated with an automatic or periodic reorder for an item, corresponding delivery time, location information, purchase history, etc.) and the consumption data to identify an updated quantity of the item that would result in the user more efficiently utilizing the supply of the item until the next reorder is processed and delivered. For example, a user may have an order for eight eggs with a standing delivery to provide the eggs every five days. The service provider computer may be configured to determine, using the consumption data, that an increase to twelve eggs for the automatic reorder may result in the user having enough eggs to last the five days rather than running out of eggs prior to the five days as indicated by the current consumption data information.

As described herein, the service provider computer can dynamically adjust the reorder recommendation, which includes an updated quantity or an item, based on newly received sensor data to reflect the changing requirements or needs of a user with regard to the item associated with the ARD. For example, a user may invite a large portion of their extended family over for a week and the eggs usage in the household may increase by a multitude of order. In such cases, the server provider computer may be configured to utilize the updated consumption data to automatically reorder more eggs for the user for delivery prior to using all the supplies and update the reorder quantity of the item as described above. The process 600 may include generating a recommendation to update a reorder quantity for the item to the determined updated quantity for the item at 610 (e.g., the recommendation may indicate that the user should approve or consent to an increase in the automatic order of eggs to go from eight eggs to twelve eggs based on their consumption data). The process 600 may conclude at 612 by transmitting the recommendation to update the reorder quantity to a user device associated with the user profile. The recommendation may be transmitted as an email, a user interface object for a web browser or application, or as an SMS text message. In some embodiments, based on user preferences, the service provider computers may automatically update the quantity of the item for reorder without notifying the user based on the consumption data. In embodiments, a recommendation for updating an automatic reorder threshold or reorder threshold for an item and ARD may be generated based on aggregate consumption data of other users interacting with the same item and corresponding ARDs. The service provider computer may maintain aggregate consumption data and select a subset or portion of the aggregate consumption data based on similarities between user profiles or characteristics of the users. For example, the service provider computer may select a subset of consumption data to compare to a given user's consumption data for an item associated with an ARD based at least in part on similar search histories, demographic information, or other information maintained in a user profile.

The process 700 may include maintaining order history information associated with a user profile for a plurality of items at 702. For example, a user profile for a user may include information that identifies one or more items purchased or ordered by the user from one or more online merchants, e-commerce providers, etc. The order history information may include information for both items that are and are not associated with an ARD such that consumption data or rates are not available for the items not associated with an ARD. In embodiments, the process 700 may include receiving, from a sensor of an ARD, sensor data for an item that is associated with an ARD at 704. As described herein, an ARD may be configured to utilize communication connections to send periodic or real time sensor data obtained by associated sensors of the ARD to service provider computers via available networks. The process 700 may include determining consumption data for the item based at least in part on the sensor data at 706.

The process 700 may include determining a subset of items of the plurality of items based at least in part on the consumption data and the order history information at 708. In accordance with at least one embodiment, the service provider computer may be configured to identify or generate new associations between items based on the order history information and the consumption data. For example, the service provider computer may be configured to identify one or more trends between items that are automatically reordered (e.g., items that are associate with an ARD) and items that are not associated with an ARD. For example, a user may have an ARD that is associated with flour. When they are baking a cake they may use a large amount of flour and butter. The flour would be automatically reordered based on the sensor data of the associated ARD and derived consumption data indicating that a level of the flour was equal to or below the reorder threshold for the flour. However, the user may also manually order the butter at the same or substantially the same time that the reorder for the flour is made. Trends or associations between items may be identified by the service provider computer using information from multiple user profiles (e.g., multiple sets of ARD data and user profile information) to make recommendations for users to order items when another item is automatically reordered. In a given use case, the user may be utilizing the flour for some other recipe that does not require butter and as such they can choose to ignore the recommendations made by the service provider computer. However, in other cases the recommendations may be timely, appropriate, and save the user from having to associate multiple ARDs to each item in their household. The process 700 may conclude at 710 by transmitting a notification to a user device of a user associated with the user profile. The notification may identify delivery of the subset of items to a location associated with the user profile. In embodiments, the user may interact with the notification to result in instructing, by the service provider computers, the ordering and delivery of the subset of items to their location.

In accordance with at least one embodiment, the service provider computer may generate recommendations (e.g., product or quantity recommendations) for users that may be provided to a user during a browsing session of an electronic marketplace. The recommendations may be for users that are not associated with an ARD and therefore not providing sensor data that can be used to determine a corresponding consumption rate. Instead, the service provider computer implementing the sensor based recommendation feature may utilize consumption data of similar users to generate the recommendations (e.g., users that are providing sensor data from associated ARDs). The service provider computer may identify relationships or groups of user profiles based on user characteristics or other information included in a user profile for a given user. For example, the user profile information may indicate a user's order or purchase history of items or services, geographic location information corresponding to geographic coordinates in a physical space, user provided input for electronic marketplaces such as reviews or comments for items, social media information such as groups or the like that the user may identify with in an associated social media network, search history information that corresponds to queries provided by users when browsing an electronic marketplace, etc. The service provider computer may generate one or more groups of user profiles that have similar interests in items based on their purchase history or user provided input. In embodiments, the service provider computer may generate recommendations for users not utilizing an ARD based on consumption data from similar users who are associated with an ARD. For example, a subset of user profiles may include data that corresponds to consumption information or data for a particular product. Another subset of user profiles that are similar or belong to the same group who do not have associated data that corresponds to consumption information may be provided with a recommendation for the particular product based on both users previously purchasing the item and the consumption rate or data from the user that is associated with an ARD. To further illustrate, the service provider computer may generate recommendations for a subset of user profiles that do not utilize an ARD based on another subset of user profiles that do utilize an ARD and are in the same group based on similar geographic data (e.g., addresses that are within a certain geographic distance of each other)

Figure 8:
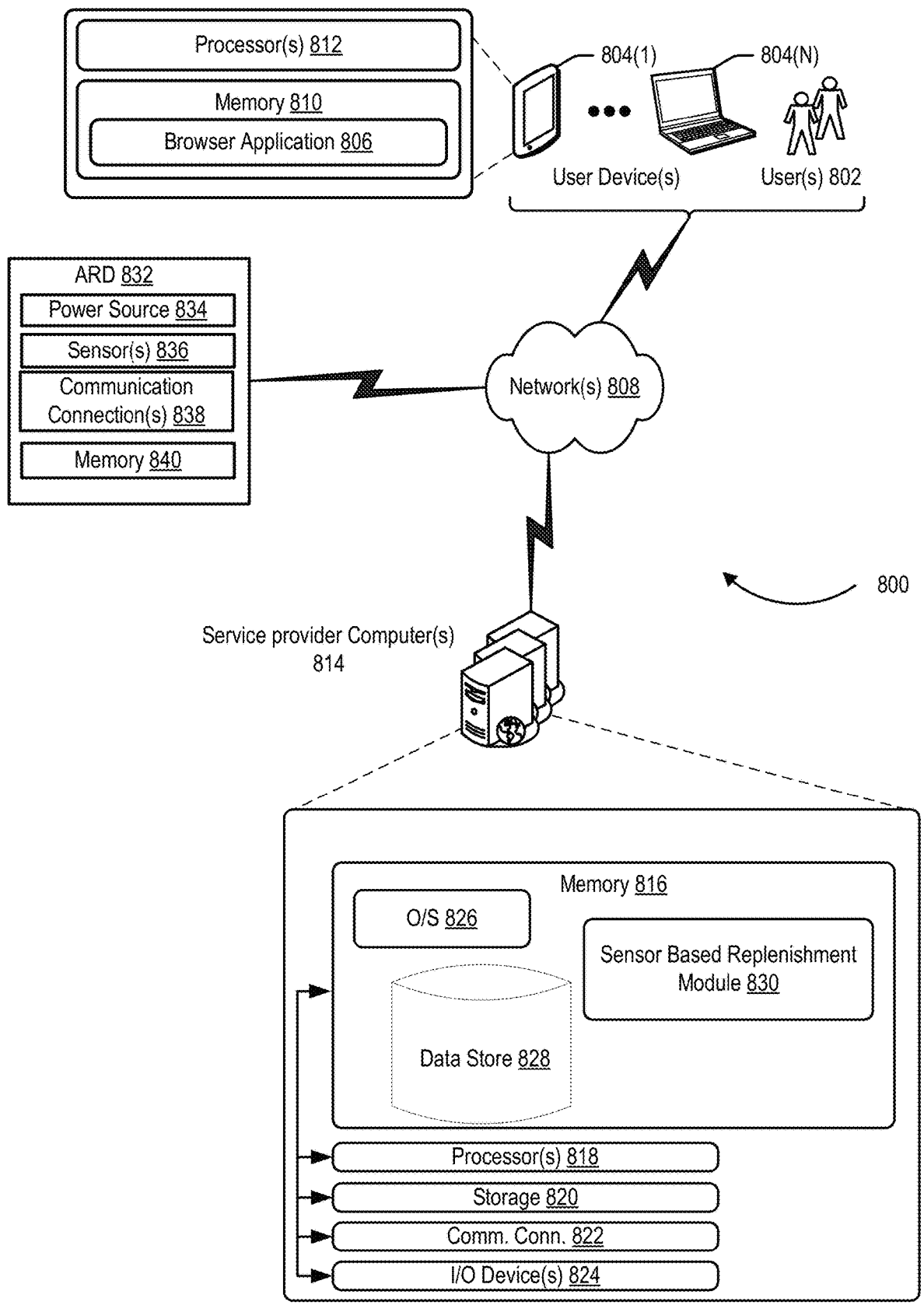
FIG. 8 illustrates an example architecture for implementing a sensor based recommendation feature as described herein that includes one or more service provider computers, a user device, and/or an ARD connected via one or more networks, in accordance with at least one embodiment.

FIG. 8 illustrates an example architecture for implementing a sensor based recommendation feature as described herein that includes one or more service provider computers, a user device, and/or an ARD connected via one or more networks, in accordance with at least one embodiment. In architecture 800, one or more users 802 (e.g., customers, users, consumers, etc.,) may utilize user computing devices 804(1)-(N) (collectively, user devices 804) to access a browser application 806 or a user interface (UI) accessible through the browser application 806, via one or more networks 808 to interact with recommendations, advertisements, or deals, or otherwise update order settings for an ARD as disclosed in the sensor based recommendation feature. In embodiments, the one or more users 802 may utilize user computing devices 804(1)-(N) to access the browser application 806 or a UI accessible through the browser application 806, via one or more networks 808, to request content or otherwise interact with content from a third party computer (not pictured). The "browser application" 806 can be any browser control or native application that can access and display a network page or other information such as a user interface of a native software application for enabling the selection or interaction with advertisements, recommendations, or a user interface for updating settings associated with an ARD including updating a reorder threshold, updating a quantity of an amount associated with an ARD, etc. A native software application may include an application or program that has been developed for use on a particular platform (such as an operating system) or a particular device (such as a particular type of mobile device or user device 804). In embodiments, the user device 804 may include one or more components for enabling the user 802 to interact with the browser application 806.

The user devices 804 may include at least one memory 810 and one or more processing units or processor(s) 812. The memory 810 may store program instructions that are loadable and executable on the processor(s) 812, as well as data generated during the execution of these programs. Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 810 may include multiple different types of memory, such as static random access memory (SRAM), dynamic random access memory (DRAM), or ROM.

Turning to the contents of the memory 810 in more detail, the memory 810 may include an operating system and one or more application programs or services for implementing the features disclosed herein. Additionally, the memory 810 may include one or more modules for implementing the features described herein including the sensor based replenishment module 830.

The architecture 800 may also include one or more service provider computers 814 that may, in some examples, provide computing resources such as, but not limited to, client entities, low latency data storage, durable data store, data access, management, virtualization, hosted computing environment or "cloud-based" solutions, electronic content performance management, media streaming services, content generation, etc. The service provider computers 814 may implement or be an example of the service provider computer(s) described herein with reference to FIGS. 1-7 and throughout the disclosure. The one or more service provider computers 814 may also be operable to provide site hosting, media streaming services, computer application development, and/or implementation platforms, combinations of the foregoing, or the like to the one or more users 802 via user devices 804.

In some examples, the networks 808 may include any one or a combination of many different types of networks, such as cable networks, the Internet, wireless networks, cellular networks, and other private and/or public networks. While the illustrated examples represent the users 802 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the features disclosed herein including the sensor based replenishment module 830. In accordance with at least one embodiment, the sensor based replenishment module 830 may be configured to maintain a user profile associated with a user, determine consumption data for an item associated with an ARD based on sensor data transmitted by an ARD, and generate one or more recommendations to update a quantity of an item that is already being reordered, a recommendation for items not associated with an ARD based on associations or relationships identified using the sensor data of an ARD, or generate recommendations for users not associated with an ARD using consumption data of similar users that are associated with an ARD. The architecture of FIG. 8 also includes an ARD 832 that further includes a power source 834, sensors 836, communication connections 838, and memory 840. The ARD 832 may be an example of ARDs 200, 300, and 400 of FIGS. 2-4. The configuration and functionality of components 834, 836, and 838 are disclosed above with respect to FIG. 4. Depending on the configuration and type of the ARD 832, the memory 840 may be volatile (such as RAM) and/or non-volatile (such as ROM, flash memory, etc.). As disclosed herein, the ARD may be configured to obtain sensor data using sensors 836 about items stored by or contained by ARD 832 that indicates an amount of the item stored or contained by ARD 832. In embodiments, the ARD 832 may be configured to utilize the communication connections 838 to transmit the sensor data of sensors 836, via networks 808, to the service provider computers 814 for determining a consumption rate or consumption data for the item stored by or contained within the ARD 832.

Figure 9:
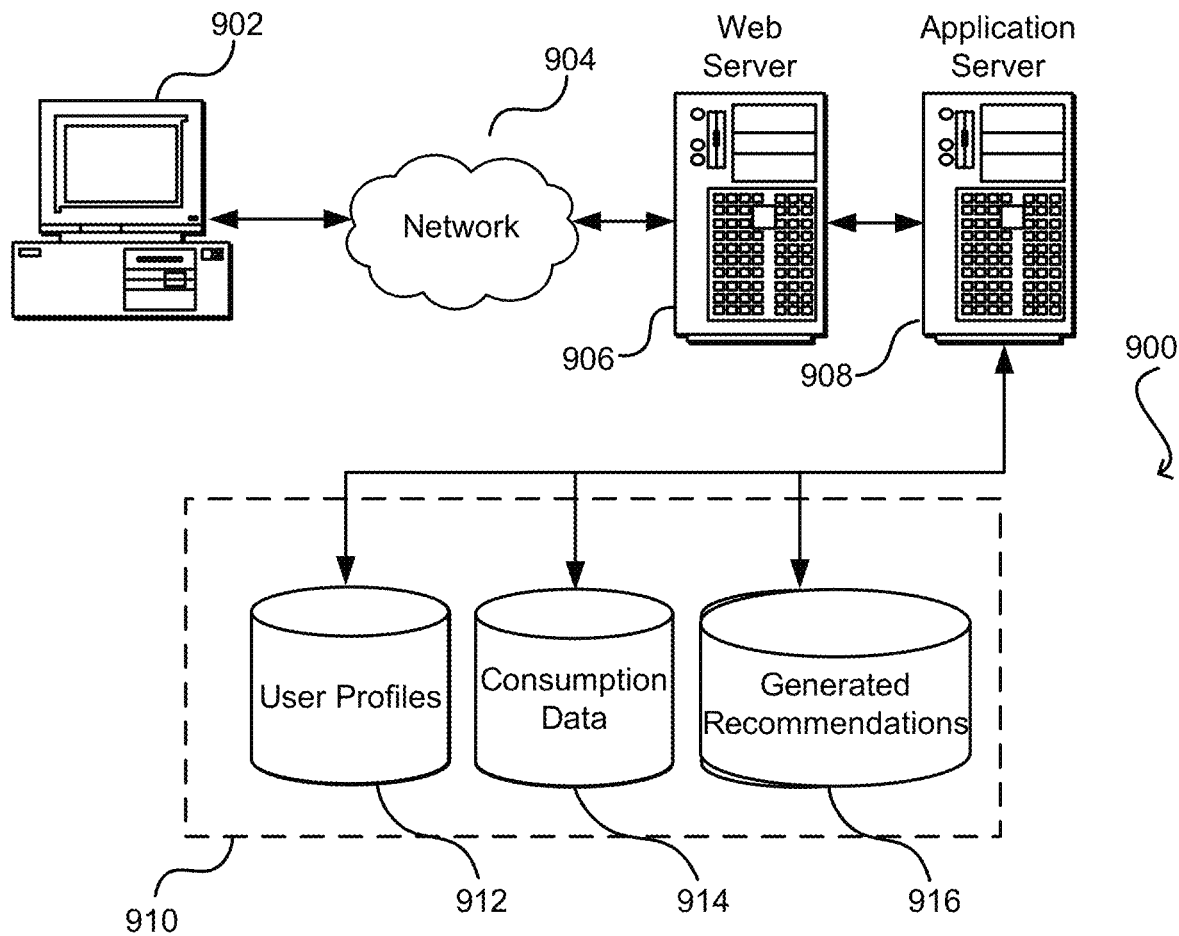
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing user profiles and associated information 912 as well as generated recommendations 916, which can be used to serve content for the production side, compare user characteristics included in the user profiles to generate recommendations for similar users, generate recommendations to update a quantity of an item that is automatically reordered based on consumption date, or generate recommendations for items for users that do not utilize an ARD based on consumption data from a similar user that does utilize an ARD. The data store also is shown to include a mechanism for storing consumption data 914, which can be used for reporting, analysis, or other such purposes such as identifying a consumption rate or use of an item based on sensor data obtained by an ARD and communicated to the servers 906 and/or 908. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a computer system, a user profile that indicates an amount of an item that is ordered automatically on behalf of a user and delivered at a periodic interval, the item being stored by an automatic replenishment device (ARD) that is configured to obtain, via an associated sensor, sensor data indicating a current amount for the item being stored by the ARD;
   receiving, by the computer system, the sensor data from the ARD;
   determining, by the computer system, consumption data for the item based on the sensor data received from the ARD over time;
   determining, by the computer system, an updated amount for the item in response to determining that the amount of the item is expected to be consumed prior to expiration of the periodic interval based at least in part on the consumption data;
   generating, by the computer system, a recommendation to update a reorder amount for the item from the amount to the updated amount;
   generating, by the computer system, a notification indicating that a discount is available for an automatic order for the item based at least in part on other sensor data from other ARDs associated with other items indicated in the user profile; and
   transmitting, by the computer system, the recommendation to update the reorder amount and the notification to a user device associated with the user profile.

2. The computer-implemented method of claim 1, wherein the user profile includes user preferences that indicate a confirmation of the automatic order for the item must be obtained prior to automatically ordering the item.

3. The computer-implemented method of claim 1, wherein the user profile includes information that identifies a reorder threshold for the item that represents a percentage of the item being stored by the ARD.

4. The computer-implemented method of claim 3, wherein the sensor data indicates a current weight for the item, and where ordering the item automatically on behalf of the user is based at least in part on a current weight for the item that is being stored by the ARD being equal to or less than the reorder threshold.

5. A computer system comprising:
   a memory configured to store computer-executable instructions; and
   a processor in communication with the memory configured to execute the computer-executable instructions to at least:
      maintain a plurality of user profiles, a user profile of the plurality of user profiles including one or more characteristics for an associated user;
      obtain sensor data of an automatic replenishment device (ARD) associated with a particular item, the sensor data associated with a particular user profile of the plurality of user profiles;
      determine a consumption rate for the particular item based at least in part on the sensor data;
      determine a subset of user profiles from the plurality of user profiles based at least in part on a comparison of the one or more characteristics of the plurality of user profiles and the one or more characteristics of the particular user profile; and
      generate a recommendation for the subset of user profiles that includes order information for the particular item.

6. The computer system of claim 5, wherein determining the subset of user profiles is further based at least in part on determining a confidence score that represents similarity between the one or more characteristics of a given user profile of the subset of user profiles and the one or more characteristics of the particular user profile.

7. The computer system of claim 6, wherein determining the subset of user profiles is further based at least in part on the confidence score being equal to or above a certain threshold.

8. The computer system of claim 5, wherein the one or more characteristics comprises at least one of demographic information, geographic location information, purchase history information, search history information, or user preference information.

9. The computer system of claim 5, wherein the processor when executing the computer-executable instructions is further configured to transmit the recommendation to one or more internet of thing devices associated with the subset of user profiles, and to determine a reorder threshold for the particular item based at least in part on aggregate sensor data from a plurality of ARDs associated with the particular item.

10. A non-transitory computer-readable storage medium storing computer-executable instructions that, when executed by a computer system, configure the computer system to perform operations comprising:
   maintaining a plurality of user profiles, a user profile of the plurality of user profiles including one or more characteristics for an associated user;
   obtaining sensor data of an automatic replenishment device (ARD) associated with a particular item, the sensor data associated with a particular user profile of the plurality of user profiles;
   determining a consumption rate for the particular item based at least in part on the sensor data;
   determining a subset of user profiles from the plurality of user profiles based at least in part on a comparison of the one or more characteristics of the plurality of user profiles and the one or more characteristics of the particular user profile; and generating a recommendation for the subset of user profiles that includes order information for the particular item.

\* \* \* \* \*

UNITED STATES PATENT AND TRADEMARK OFFICE
CERTIFICATE OF CORRECTION

PATENT NO. : 10,846,780 B2  
APPLICATION NO. : 15/927990  
DATED : November 24, 2020  
INVENTOR(S) : Dave Jonathan Lefkow et al.

Page 1 of 1

It is certified that error appears in the above-identified patent and that said Letters Patent is hereby corrected as shown below:

On the Title Page

Item (72), Inventors, should read:  
Dave Jonathan Lefkow, Bellevue, WA;  
Chris Brown, Seattle, WA;  
Samuel Stevens Heyworth, Seattle, WA;  
Amirali Virani, Bellevue, WA;  
Hannah McClellan Richards, Boise, ID Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*